US012791965B2

(12) United States Patent
Kawasumi

(10) Patent No.: US 12,791,965 B2
(45) Date of Patent: Nov. 10, 2026

(54) FIXING DEVICE INCLUDING PRESSURE MECHANISM THAT ADJUSTS CONTACT PRESSURE OF FIXING NIP PORTION

(71) Applicant: KYOCERA Document Solutions Inc., Osaka (JP)

(72) Inventor: Takuya Kawasumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/170,222

(22) Filed: Apr. 4, 2025

(65) Prior Publication Data

US 2025/0321519 A1 Oct. 16, 2025

(30) Foreign Application Priority Data

Apr. 15, 2024 (JP) ................................ 2024-065393

(51) Int. Cl.
*G03G 15/20* (2006.01)

(52) U.S. Cl.
CPC ....... *G03G 15/2032* (2013.01); *G03G 15/206* (2013.01); *G03G 15/2064* (2013.01); *G03G 2215/2025* (2013.01)

(58) Field of Classification Search
USPC ........................................................... 399/67
See application file for complete search history.

(56) References Cited

U.S. PATENT DOCUMENTS

2020/0387097 A1* 12/2020 Obata ................ G03G 15/2064

FOREIGN PATENT DOCUMENTS

JP 2004294541 A * 10/2004 ......... G03G 15/2064
JP 2016102985 A * 6/2016
JP 2020-201357 A 12/2020

OTHER PUBLICATIONS

English Abstract for JP2016102985A to Mizuta et al. (Year: 2018).*

* cited by examiner

*Primary Examiner* — Quana Grainger
(74) *Attorney, Agent, or Firm* — Stein IP, LLC

(57) ABSTRACT

A fixing device includes a heating member, a pressure member, a pressure mechanism, and a fixing frame. The pressure mechanism includes a pressure plate, a biasing member, a cam member, and a support member. The pressure plate swings in an approaching direction and a separating direction with respect to one of the heating member and the pressure member. The biasing member biases the pressure plate in the approaching direction with respect to one of the heating member and the pressure member. The cam member contacts the pressure plate on a side opposite to the biasing member and rotates to cause the pressure plate to swing. The support member is secured to the fixing frame and supports one end of the biasing member and a swing fulcrum of the pressure plate. The support member has a through hole in which a rotation axis of the cam member is inserted.

4 Claims, 10 Drawing Sheets

FIXING DEVICE INCLUDING PRESSURE MECHANISM THAT ADJUSTS CONTACT PRESSURE OF FIXING NIP PORTION

INCORPORATION BY REFERENCE

This application is based on and claims the benefit of priority from Japanese Patent Application No. 2024-065393 filed on Apr. 15, 2024, the contents of which are hereby incorporated by reference.

BACKGROUND

The present disclosure relates to a fixing device and an image forming apparatus.

In electrophotographic image forming apparatuses, such as copiers and printers, fixing devices are widely used that adopt a heat fixing method to fix, onto a recording medium in a sheet form, an unfixed toner image formed on the recording medium. The recording medium passes through a fixing nip portion formed by a heating member and a pressure member contacting each other, and thereby receives heat and pressure to have the unfixed toner image fixed onto the recording medium. Such fixing devices are provided with a pressure mechanism that forms the fixing nip portion between the heating member and the pressure member.

SUMMARY

According to one aspect of the present disclosure, a fixing device includes a heating member, a pressure member, a pressure mechanism, and a fixing frame, and inserts a recording medium having a toner image formed thereon into a fixing nip portion to apply heat and pressure to the recording medium to thereby fix the toner image onto the recording medium. The pressure member contacts the heating member and has pressure applied thereto to form the fixing nip portion. The pressure mechanism adjusts contact pressure of the fixing nip portion. The fixing frame supports the heating member, the pressure member, and the pressure mechanism. The pressure mechanism includes a pressure plate, a biasing member, a cam member, and a support member. The pressure plate swings in an approaching direction and a separating direction with respect to one of the heating member and the pressure member. The biasing member biases the pressure plate in the approaching direction with respect to one of the heating member and the pressure member. The cam member contacts the pressure plate on a side opposite to the biasing member, and rotates to cause the pressure plate to swing. The support member is secured to the fixing frame and supports one end of the biasing member and a swing fulcrum of the pressure plate. The support member has a through hole in which a rotation axis of the cam member is inserted.

DETAILED DESCRIPTION

Hereinafter, an embodiment of the present disclosure will be described with reference to the accompanying drawings. It should be understood that the present disclosure is not limited to the following descriptions.

Figure 1:
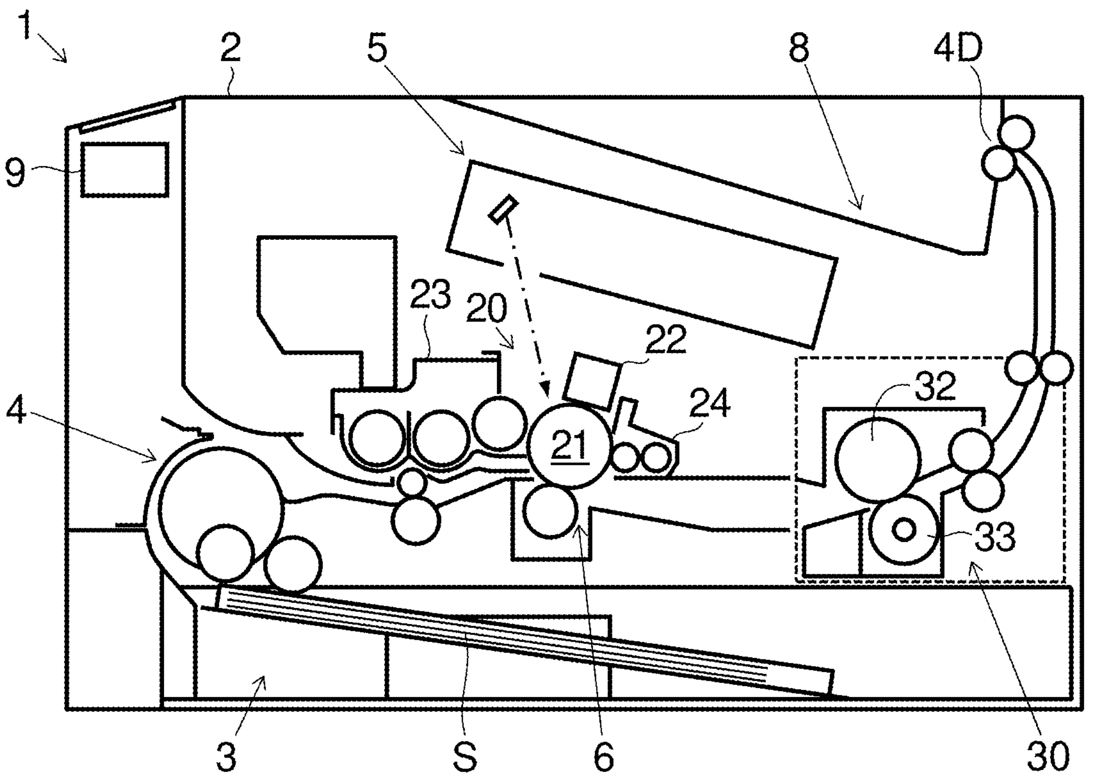
FIG. 1 is a schematic sectional side view of an image forming apparatus according to one embodiment of the present disclosure.

FIG. 1 is a schematic sectional side view of an image forming apparatus 1 according to the embodiment. One example of the image forming apparatus 1 of the present embodiment is what is called a printer that executes printing based on image data and printing instructions for a print job received from an external computer.

As shown in FIG. 1, the image forming apparatus 1 includes, arranged in a main body 2 thereof, a sheet feed portion 3, a sheet conveyance portion 4, an exposure portion 5, an image forming portion 20, a transfer portion 6, a fixing device 30, a sheet discharge portion 8, and a control portion 9.

The sheet feed portion 3 is disposed in a lower part of the main body 2. The sheet feed portion 3 stores a plurality of sheets (recording media) S, and sends out the sheets S separately one by one during printing. The sheet conveyance portion 4 conveys a sheet S sent out from the sheet feed portion 3 to the transfer portion 6 and the fixing device 30, and further discharges the sheet S, after fixing, through a sheet discharge port 4D into the sheet discharge portion 8. The exposure portion 5 emits laser light, which is controlled based on image data, toward the image forming portion 20 to irradiate it with the laser light.

The image forming portion 20 is disposed above the sheet feed portion 3. The image forming portion 20 includes a photosensitive drum 21 that is supported so as to be rotatable in a predetermined direction (counterclockwise in FIG. 1). The image forming portion 20 further includes, around the photosensitive drum 21, a charging portion 22, a developing portion 23, and a cleaning portion 24, which are arranged along a rotation direction of the photosensitive drum 21. Note that, between the developing portion 23 and the cleaning portion 24, a transfer portion 6 is disposed.

The photosensitive drum 21 has a photosensitive layer on an outer circumferential surface thereof. The charging portion 22 charges a surface (the outer circumferential surface) of the photosensitive drum 21 to a predetermined potential. The exposure portion 5 exposes the outer circumferential surface of the photosensitive drum 21 with light after the outer circumferential surface is charged by the charging portion 22, and thereby, an electrostatic latent image of an original image is formed on the outer circumferential surface of the photosensitive drum 21. The developing portion 23 develops the electrostatic latent image by causing toner to adhere to the electrostatic latent image, and thereby forms a toner image.

The transfer portion 6 is disposed at a position that is above the sheet feed portion 3 but below the image forming portion 20. The transfer portion 6 causes the toner image formed on the outer circumferential surface of the photosensitive drum 21 to be transferred onto a sheet S. After the toner image is transferred, the cleaning portion 24 performs cleaning by removing residual toner and the like remaining on the outer circumferential surface of the photosensitive drum 21.

The fixing device 30 is disposed, in the sheet conveyance portion 4, at a position that is downstream of the image forming portion 20 and the transfer portion 6 in a sheet conveyance direction. The fixing device 30 inserts the sheet S into a fixing nip portion, which will be described later, and applies heat and pressure to the seat S to thereby fix, onto the sheet S, the toner image having been transferred (formed) onto the sheet S.

The sheet discharge portion 8 is disposed on a top surface of the main body 2. The sheet S having undergone printing with the toner image fixed thereon is conveyed to the sheet discharge portion 8. The printed sheet (printed matter) can be taken out of the sheet discharge portion 8 from above the main body 2.

The control portion 9 includes a CPU, an image processor, a storage portion, and other electronic circuits and electronic components (of which none is shown). The CPU controls operations of various components provided in the image forming apparatus 1 based on a control program and control data stored in the storage portion, and thereby performs processing related to the functions of the image forming apparatus 1. The sheet feed portion 3, the sheet conveyance portion 4, the exposure portion 5, the image forming portion 20, the transfer portion 6, and the fixing device 30 each individually receive a command from the control portion 9, and cooperate with each other to perform printing with respect to a sheet S. The storage portion is composed of, for example, a combination of nonvolatile storage devices such as a program ROM (read only memory), a data ROM, and the like, and a volatile storage device such as a RAM (random access memory) and the like.

Figure 2:
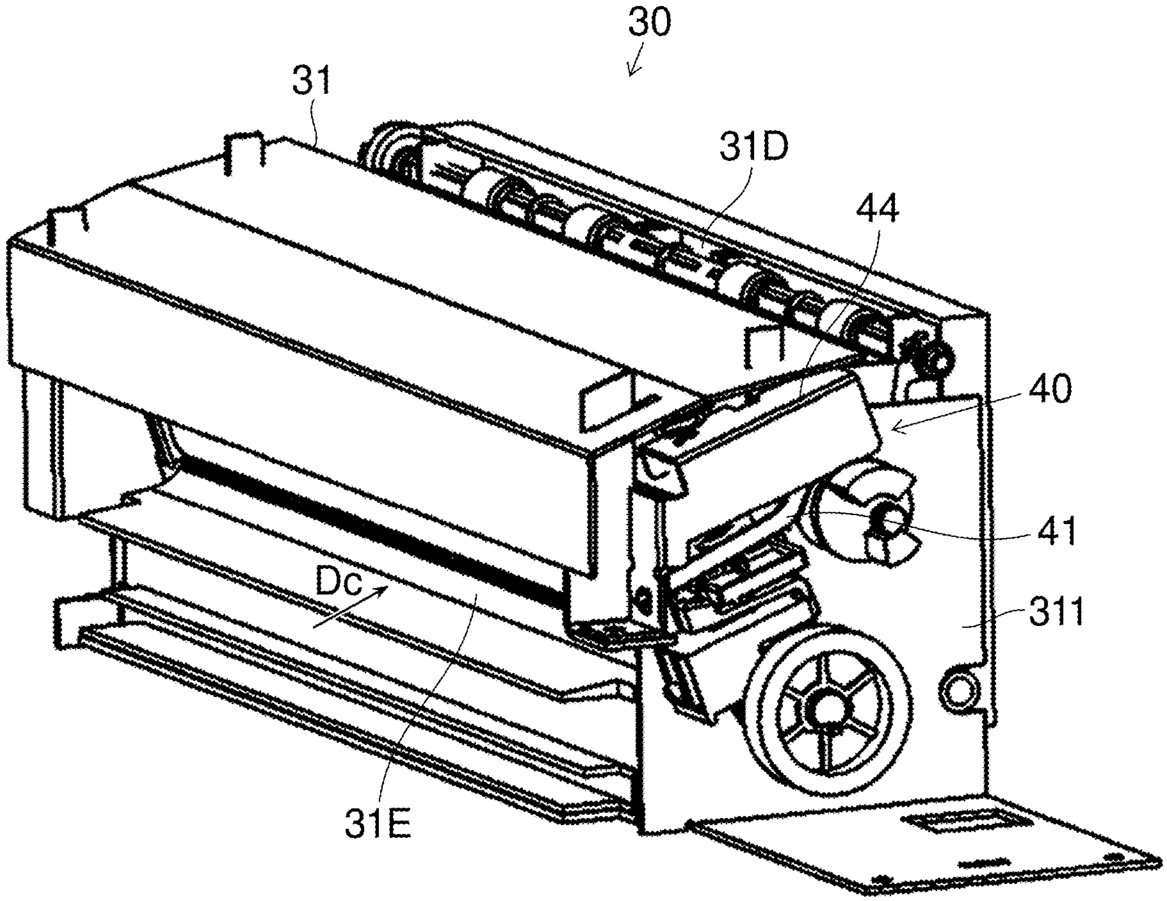
FIG. 2 is a perspective view of a fixing device of the image forming apparatus shown in FIG. 1.
Figure 3:
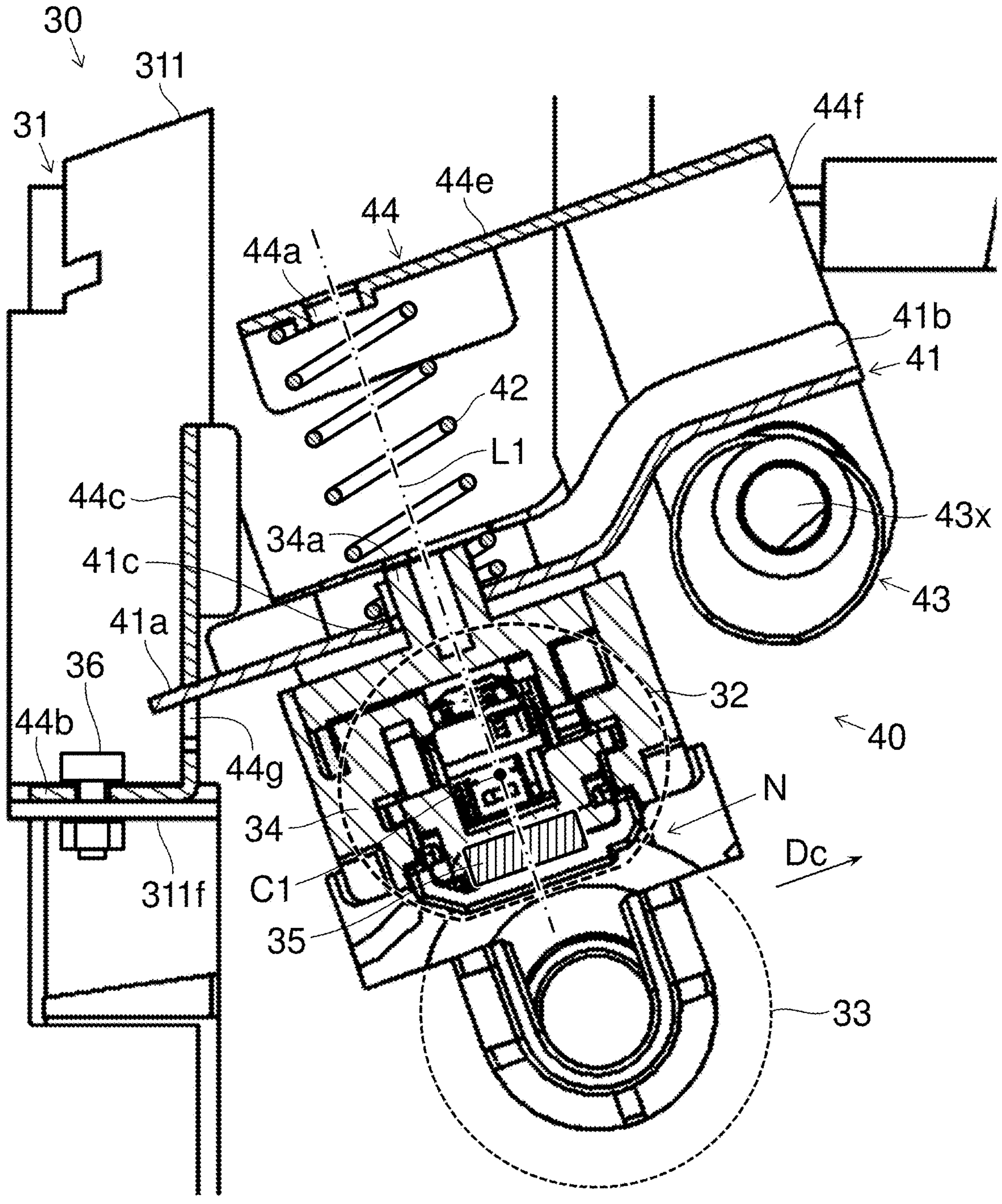
FIG. 3 is a sectional side view of and around a pressure mechanism of the fixing device shown in FIG. 2.
Figure 4:
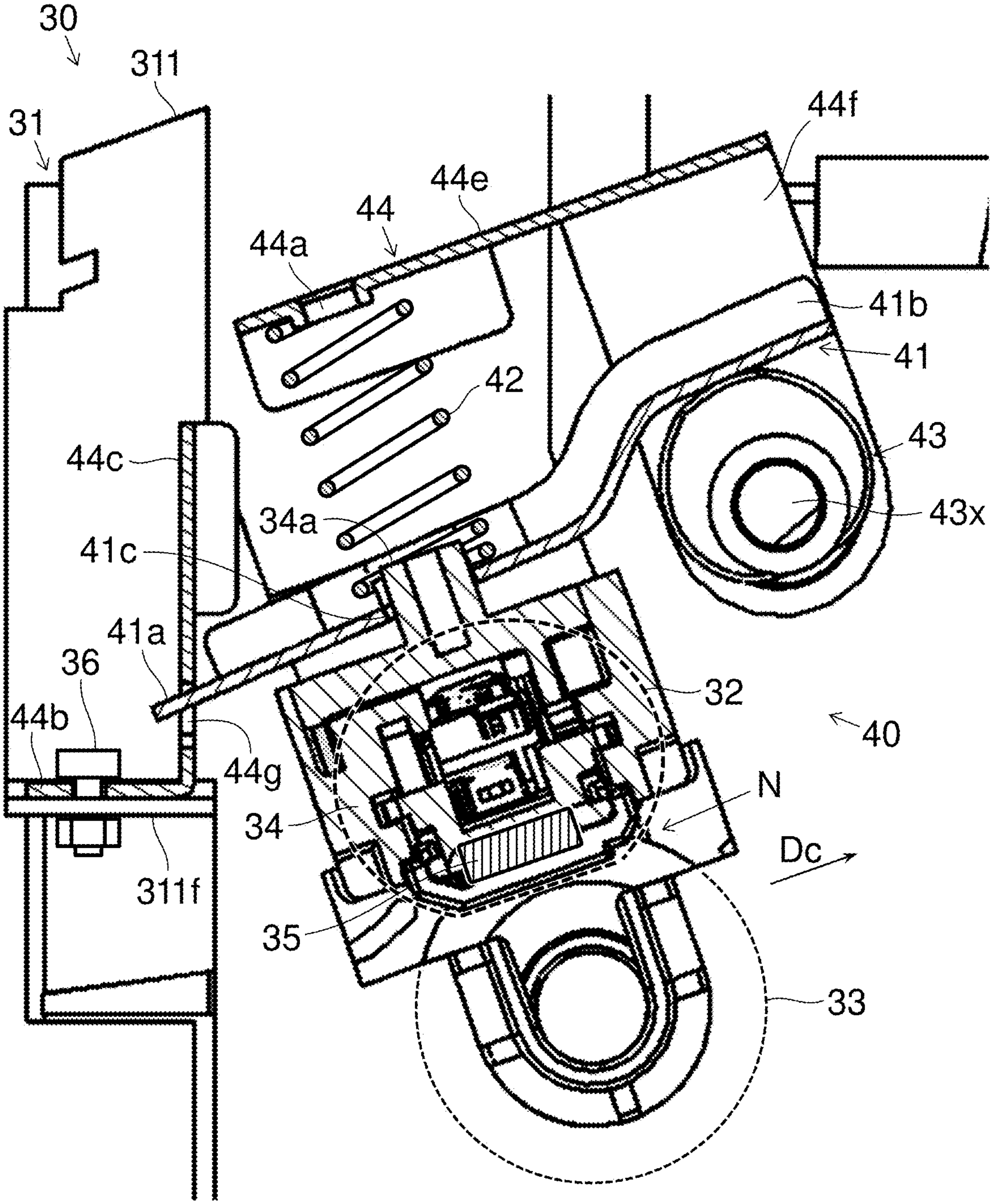
FIG. 4 is a sectional side view of and around the pressure mechanism of the fixing device shown in FIG. 3, showing a pressure released state.

Next, a configuration of the fixing device 30 will be described using FIGS. 2, 3, and 4 in addition to FIG. 1. FIG. 2 is a perspective view of the fixing device 30 of the image forming apparatus 1 shown in FIG. 1. FIG. 3 is a sectional side view of and around a pressure mechanism 40 of the fixing device 30 shown in FIG. 2. FIG. 4 is a sectional side view of and around the pressure mechanism 40 of the fixing device 30 shown in FIG. 3, showing a pressure released state.

The fixing device 30 includes, as shown in FIGS. 2, 3, and 4, a fixing frame 31, a fixing belt (a heating member) 32, a pressure roller (a pressure member) 33, and the pressure mechanism 40.

The fixing frame 31 is formed as a box body having a substantially rectangular-parallelepiped shape. Inside the fixing frame 31, the fixing belt 32 and the pressure roller 33 are housed. The fixing frame 31 has an entry port 31E and a discharge port 31D for a sheet S. The fixing frame 31 further includes a pair of side plates 311.

The pair of side plates 311 are disposed at opposite end parts of the fixing frame 31 in axial directions of the fixing belt 32 and the pressure roller 33, that is, in a sheet width direction orthogonal to the sheet conveyance direction. The pair of side plates 311 are formed in a shape of a flat plate extending in an up-down direction and the sheet conveyance direction. The pair of side plates 311 support opposite end parts of the fixing belt 32 and the pressure roller 33 in their axial directions. Further, the pair of side plates 311 supports the pressure mechanism 40.

The fixing belt 32 is endless and formed in a hollow cylindrical shape. The fixing belt 32 is supported, via a belt holder 34 disposed radially inside the fixing belt 32, on the pair of side plates 311 of the fixing frame 31. The fixing belt 32 is rotatable, about an axis extending in the sheet width direction, along the sheet conveyance direction. Note that the belt holder 34 is supported by the pair of side plates 311 provided outside the fixing belt 32 in the axial direction thereof, and ensures sufficient strength to withstand pressure application between the belt holder 34 and the pressure roller 33.

The fixing belt 32 has a multi-layer structure in which an elastic layer and a release layer are provided on an outer circumferential side of a base layer. The base layer is constituted of a film of metal, such as nickel or the like, or a polyimide film, for example. The elastic layer is constituted of, for example, a silicone rubber or the like. The release layer is constituted of a fluorine-based resin, such as PFA (tetrafluoroethylene/perfluoroalkyl vinyl ether copolymer) or the like, for example.

Radially inside the fixing belt 32, a heat source 35 is disposed. The heat source 35 is supported on the belt holder 34. The heat source 35 is positioned inside the fixing belt 32 so as to be opposite to the pressure roller 33 across the fixing belt 32. The heat source 35 is constituted of a planar heater (e.g., a resistance heating element) extending over a whole area of the fixing belt 32 in the axial direction. The heat source 35 contacts the fixing belt 32, and thereby applies heat directly to the fixing belt 32 at a fixing nip portion N. The heat source 35 has its operation controlled by the control portion 9.

The pressure roller 33 is formed in a solid cylindrical shape. The pressure roller 33 has its rotation axis supported on the pair of side plates 311 of the fixing frame 31. The pressure roller 33 is rotatable, about an axis extending in the sheet width direction, along the sheet conveyance direction.

The pressure roller 33 has a multi-layer structure in which an elastic layer and a release layer are provided on an outer circumferential side of a metal core. The metal core is constituted of a metal such as iron, aluminum, or the like, for example. The elastic layer is constituted of a silicone rubber or the like, for example. The release layer is constituted of a fluorine-based resin, such as PFA or the like, for example.

The pressure roller 33 is coupled to a drive source (unillustrated) including a motor, for example, and receives a driving force from the motor to rotate clockwise in FIGS. 1, 3, and 4. The pressure roller 33 contacts an outer circumferential surface of the fixing belt 32 to give a rotational driving force to the fixing belt 32. That is, the fixing belt 32, by contacting the pressure roller 33, is driven to rotate following the pressure roller 33. The pressure roller 33 has its operation controlled by the control portion 9.

Note that, the fixing belt 32 receives, from the pressure mechanism 40, a predetermined pressure in a direction toward the pressure roller 33. Thereby, the fixing belt 32 contacts the outer circumferential surface of the pressure roller 33 and has pressure applied thereto. Between the fixing belt 32 and the pressure roller 33, the fixing nip portion N is formed. In other words, the pressure roller 33 contacts the fixing belt 32 and has pressure applied thereto to form the fixing nip portion N.

The pressure mechanism 40 is disposed outside each of the pair of side plates 311 of the fixing frame 31. That is, the pressure mechanism 40 includes a pair of pressure mechanisms 40 provided one at each of opposite end parts in the axial directions of the fixing belt 32 and the pressure roller 33. The pair of pressure mechanisms 40 adjusts contact pressure between the fixing belt 32 and the pressure roller 33, that is, contact pressure of the fixing nip portion N.

Each of the pair of pressure mechanisms 40 includes a pressure plate 41, a pressure spring (a biasing member) 42, a cam member 43, and a support member 44.

The pressure plate 41 is disposed opposite to a corresponding one of the pair of belt holders 34 that support the opposite end parts of the fixing belt 32 in the axial direction, and is positioned on an upper side of the belt holder 34 shown in FIGS. 3 and 4. The pressure plate 41 has an elongated shape extending along a direction orthogonal to the axial direction of the fixing belt 32, that is, along the sheet conveyance direction Dc (a right-left lateral direction in FIG. 4). In the pressure plate 41, a swing fulcrum 41*a*, which is one end part (left end part in FIGS. 3 and 4) on an upstream side in the sheet conveyance direction Dc, is supported by the support member 44, and the other end part (right end part in FIGS. 3 and 4) on a downstream side in the sheet conveyance direction Dc is a swing end 41*b*. The pressure plate 41 swings in an approaching direction and a separating direction with respect to the belt holder 34 (the fixing belt 32).

The pressure spring 42 is a compression coil spring, and is disposed between the pressure plate 41 and the support member 44 so as to be positioned on an upper side of the pressure plate 41 shown in FIGS. 3 and 4. Specifically, one end part of the pressure spring 42 is supported by a spring receiving portion 44*a* formed in the support member 44. The other end part of the pressure spring 42 is supported by a boss portion 34*a* of the belt holder 34 protruding through a through hole 41*c* formed in the pressure plate 41, and is in contact with the pressure plate 41. The pressure spring 42 has an outer diameter that is larger than an inner diameter of the through hole 41*c*. By swinging of the pressure plate 41, the pressure spring 42 is caused to contract between the pressure plate 41 and the support member 44. In other words, the pressure spring 42 biases the pressure plate 41 in the approaching direction with respect to the belt holder 34 (the fixing belt 32).

The cam member 43 is disposed on a same side as the belt holder 34 with respect to the pressure plate 41, that is, below the pressure plate 41 shown in FIGS. 3 and 4. In other words, the cam member 43 contacts the pressure plate 41 on a side opposite to the pressure spring 42. Further, the cam member 43 is disposed opposite to the swing fulcrum 41*a* of the pressure plate 41 across the belt holder 34 and the pressure spring 42, so as to be close to the swing end 41*b* of the pressure plate 41.

The cam member 43 is coupled to a drive portion (unillustrated) including a motor and the like, and acquires a rotational driving force from the drive portion. The cam member 43 rotates about an axis of a rotation shaft 43*x* extending in the sheet width direction. The cam member 43 has a large-diameter part and a small-diameter part, differing in radial length from the axis serving as a central axis of rotation, and during its rotation, distance from the central axis to its contact point with the pressure plate 41 changes. Thereby, during its rotation, the cam member 43 causes the pressure plate 41 to swing.

FIG. 3 and FIG. 4 are diagrams respectively showing a pressure applied state and a pressure released state of the fixing nip portion N caused by the pressure mechanism 40. As shown in FIG. 3, when the small-diameter part of the cam member 43 is located opposite to the pressure plate 41, a biasing force of the pressure spring 42 causes a predetermined pressing force to act on the belt holder 34 via the pressure plate 41. Thereby, the pressure roller 33 is pressed against the fixing belt 32 to form the fixing nip portion N between itself and the fixing the fixing belt 32.

When the cam member 43 rotates by a predetermined amount from the state shown in FIG. 3 to cause the large-diameter part of the cam member 43 to contact the pressure plate 41 as shown in FIG. 4, the pressure plate 41 is caused to shift (swing) against the biasing force of the pressure spring 42 in the separating direction with respect to the belt holder 34. As a result, the pressure spring 42 is compressed between the pressure plate 41 and the support member 44, and the pressing force acting via the pressure plate 41 on the belt holder 34 is reduced. In other words, contact pressure between the fixing belt 32 and the pressure roller 33, that is, the contact pressure of the fixing nip portion N, is reduced.

Figure 5:
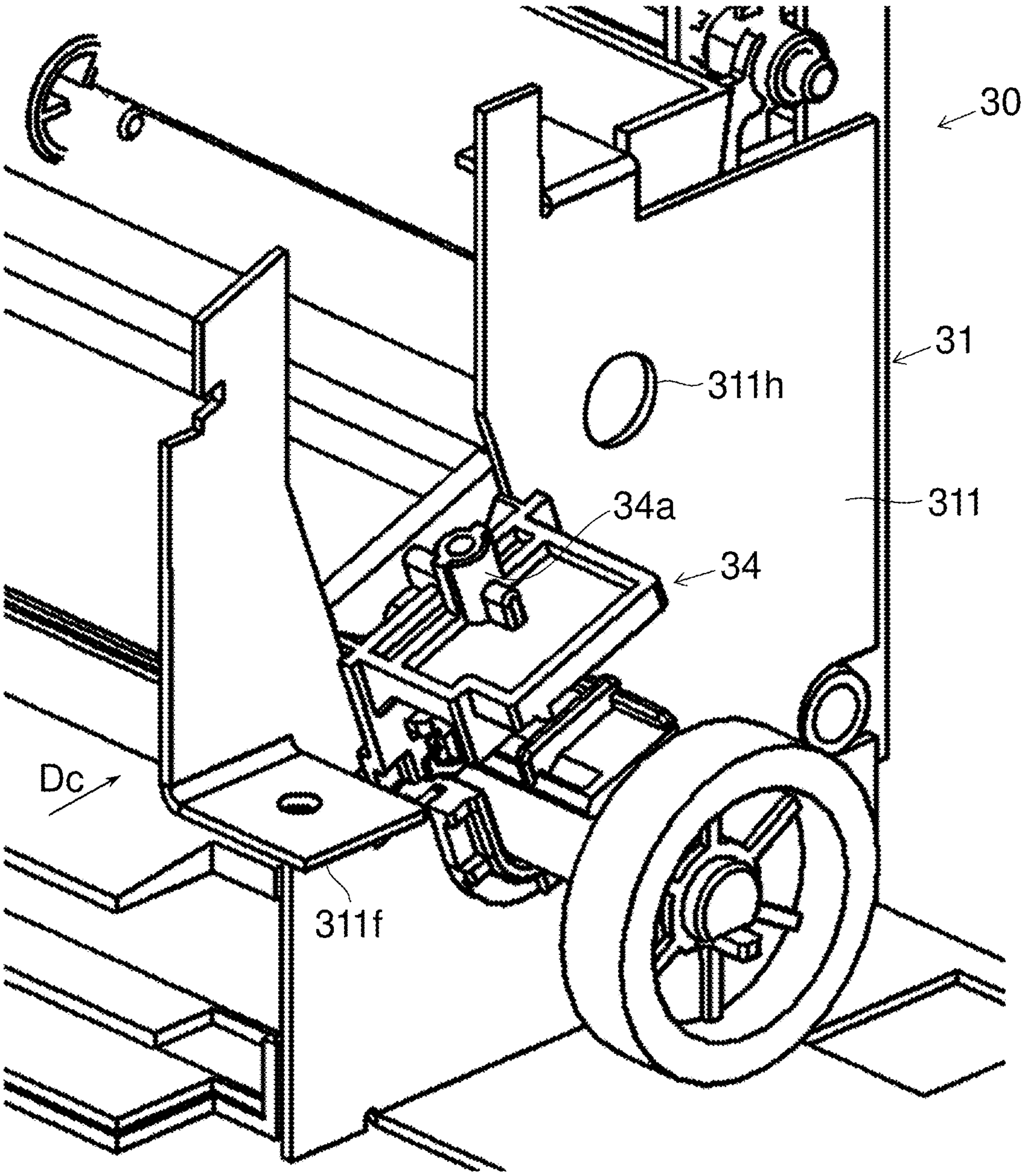
FIG. 5 is a perspective view of a fixing frame around the pressure mechanism shown in FIG. 2.
Figure 6:
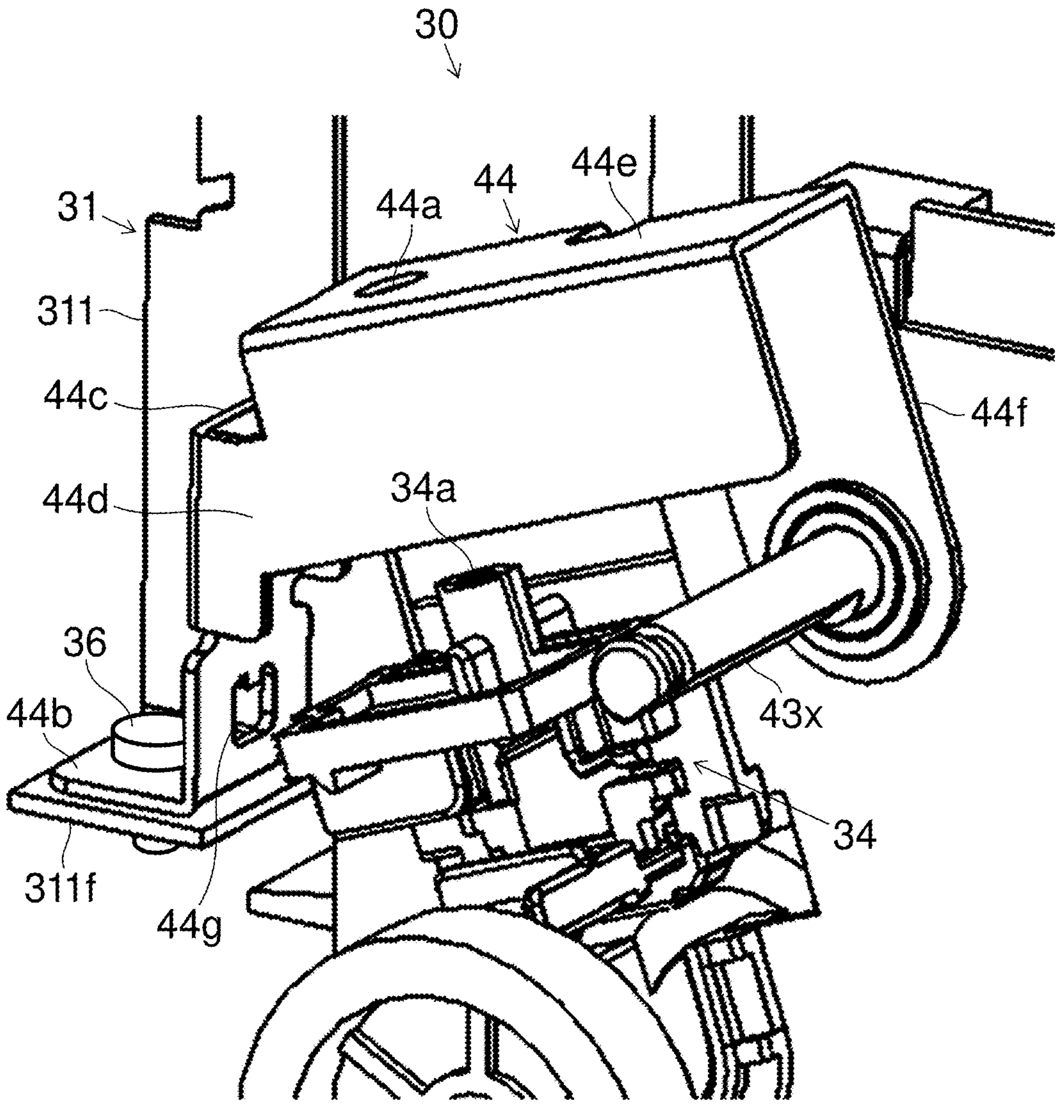
FIG. 6 is a perspective view of a support member of the pressure mechanism, with the support member secured to the fixing frame shown in FIG. 5.
Figure 7:
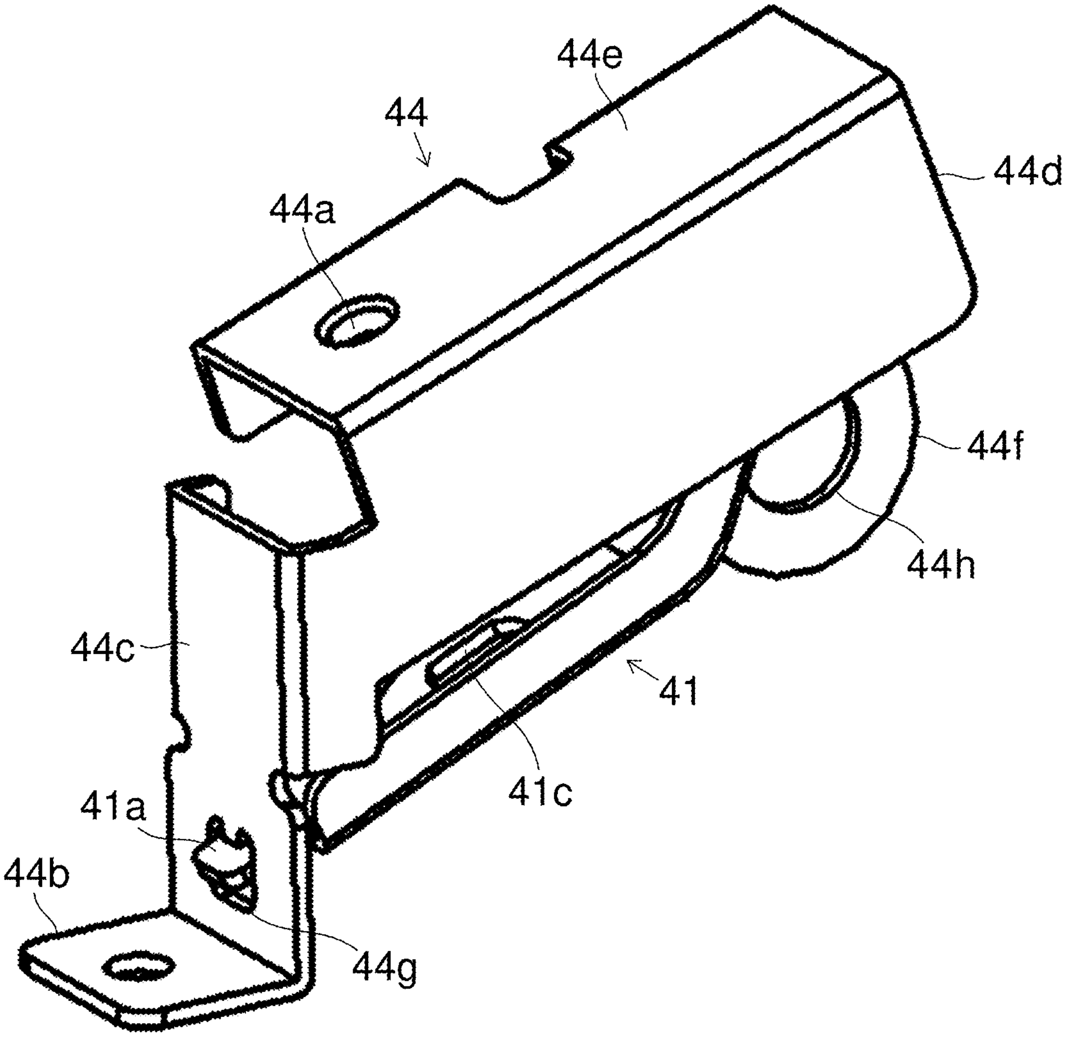
FIG. 7 is a perspective view of a pressure plate and the support member of the pressure mechanism shown in FIG. 2.
Figure 8:
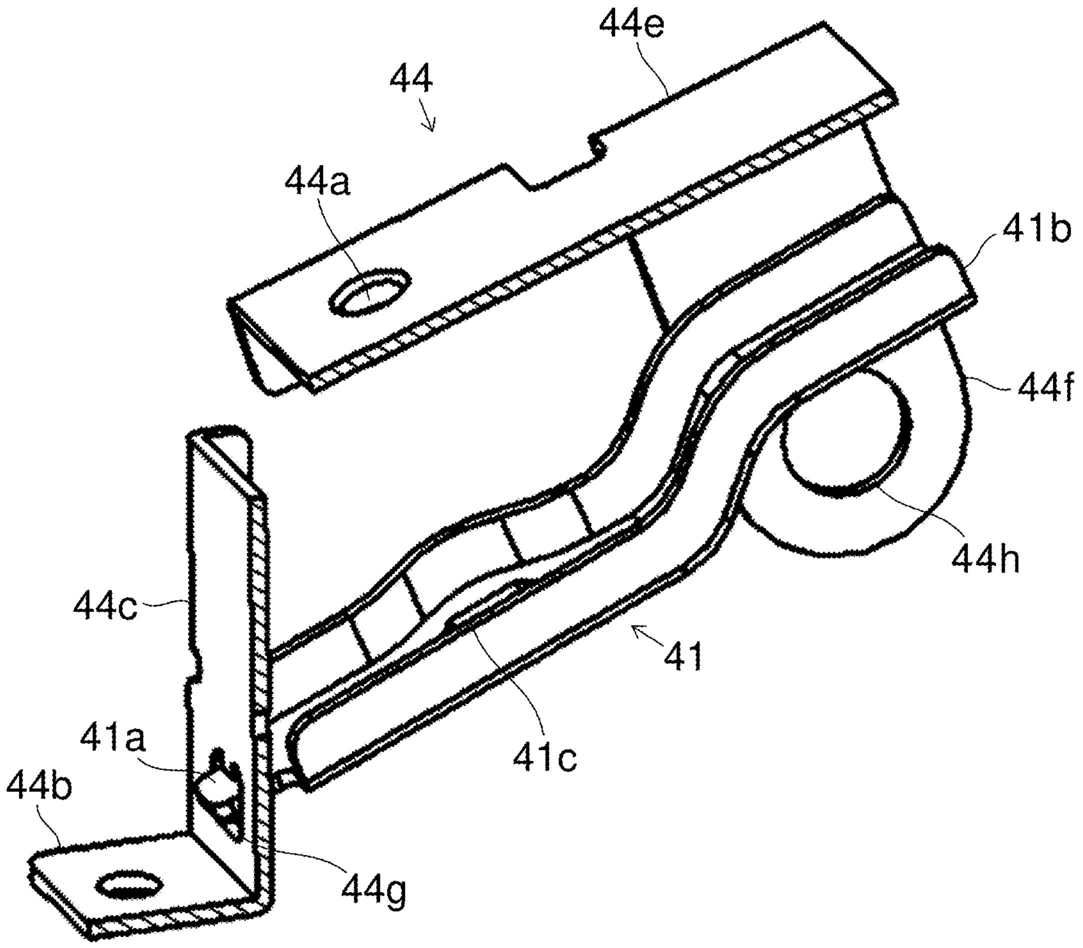
FIG. 8 is a sectional perspective view of the pressure plate and the support member of the pressure mechanism shown in FIG. 2.
Figure 9:
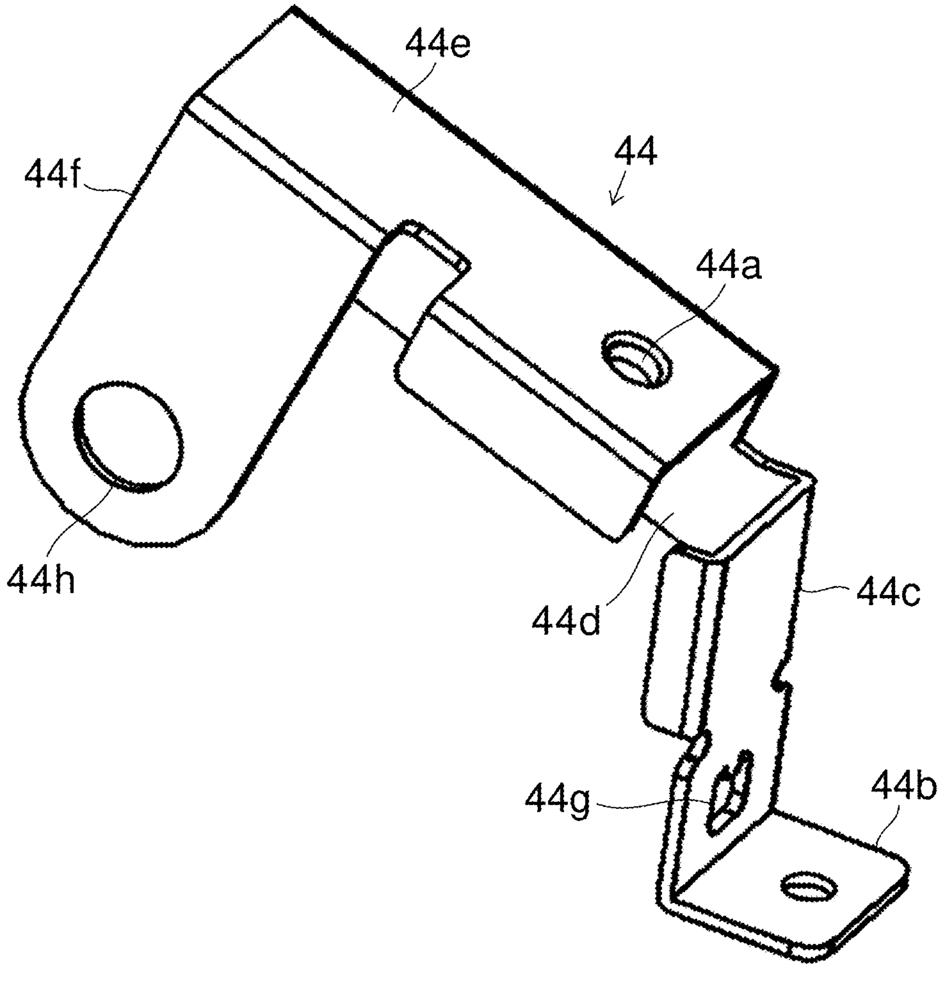
FIG. 9 is a perspective view of the support member of the pressure mechanism shown in FIG. 7.
Figure 10:
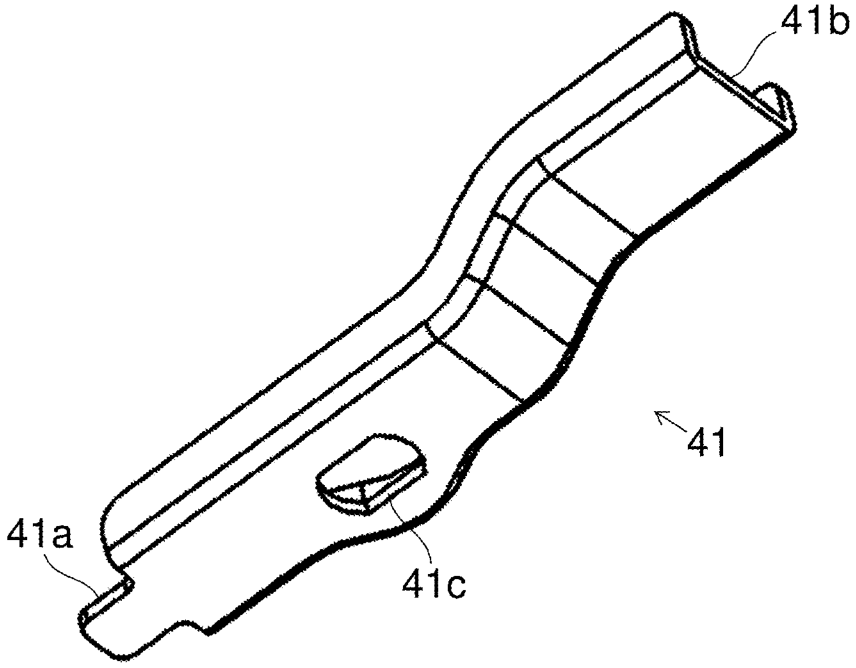
FIG. 10 is a perspective view of the pressure plate of the pressure mechanism shown in FIG. 7.

Next, details of an arrangement and a configuration of the pressure mechanism 40 will be described using FIGS. 5 to 10. FIG. 5 is a perspective view of the fixing frame 31 around the pressure mechanism 40 shown in FIG. 2. FIG. 6 is a perspective view of the support member 44 of the pressure mechanism 40, with the support member 44 secured to the fixing frame 31 shown in FIG. 5. FIG. 7 and FIG. 8 are a perspective view and a sectional perspective view, respectively, of the pressure plate 41 and the support member 44 of the pressure mechanism 40 shown in FIG. 2. FIG. 9 and FIG. 10 are perspective views of the support member 44 and the pressure plate 41, respectively, of the pressure mechanism 40 shown in FIG. 7. Note that FIG. 5 shows a state where the pressure mechanism 40 has been removed. In FIG. 6, among components of the pressure mechanism 40, only the support member 44 is illustrated, and illustration of the pressure plate 41 and the pressure spring 42 is omitted.

The support member 44 is secured to the side plate 311 of the fixing frame 31. The support member 44 incudes a lower wall portion 44*b*, a front wall portion 44*c*, a side wall portion 44*d*, an upper wall portion 44*e*, and a rear wall portion 44*f*. These wall portions are each formed in a flat-plate shape.

The lower wall portion 44*b* is positioned, in the support member 44, at a most upstream side in the sheet conveyance direction Dc, and extends substantially in a horizontal direction. The support member 44 is secured to the side plate 311 via the lower wall portion 44*b*.

The front wall portion 44*c* is positioned upstream of the belt holder 34 and the pressure spring 42 in the sheet conveyance direction Dc. The front wall portion 44*c*, continuing from the lower wall portion 44*b*, extends in the sheet width direction and also substantially vertically in the up-down direction. The front wall portion 44*c* includes a support hole 44*g* in which the swing fulcrum 41*a* of the pressure plate 41 is inserted and that supports the pressure plate 41.

The side wall portion 44*d* is positioned downstream of the front wall portion 44*c* in the sheet conveyance direction Dc. The side wall portion 44*d*, continuing from the front wall portion 44*c*, extends in the sheet conveyance direction and also substantially vertically in the up-down direction. The side wall portion 44*d* is disposed opposite to the rear wall portion 44*f* in the sheet width direction (the axial direction of the belt holder 34) across a space where the pressure plate 41 and the pressure spring 42 are disposed.

The upper wall portion 44*e* is disposed at a position that is above the front wall portion 44*c*, that is downstream of the front wall portion 44*c* in the sheet conveyance direction Dc, and that is further above the pressure spring 42, which is positioned on the upper side of the pressure plate 41. The upper wall portion 44*e*, continuing from the side wall portion 44*d*, extends in the sheet conveyance direction Dc. The upper wall portion 44*e* includes the spring receiving portion 44*a* that supports one end part of the pressure spring 42. That is, the support member 44 supports one end of the pressure spring 42 and the swing fulcrum 41*a* of the pressure plate 41.

The rear wall portion 44*f* is positioned downstream of the belt holder 34 and the pressure spring 42 in the sheet conveyance direction Dc. The rear wall portion 44*f*, continuing from the upper wall portion 44*e*, extends in the sheet conveyance direction and also substantially vertically downward in the up-down direction. The rear wall portion 44*f* is disposed opposite to the side wall portion 44*d* in the sheet width direction (the axial direction of the belt holder 34) across the space where the pressure plate 41 and the pressure spring 42 are disposed. Further, the rear wall portion 44*f* is positioned adjacent and opposite to the side plate 311.

The rear wall portion 44*f* includes a through hole 44*h*. The through hole 44*h*, at a position where the rotation shaft 43*x* of the cam member 43 is disposed, penetrates the rear wall portion 44*f* in the axial direction of the rotation shaft 43*x*, and has the rotation shaft 43*x* inserted therein. That is, the support member 44 includes the through hole 44*h* in which the rotation shaft 43*x* of the cam member 43 is inserted.

According to the above configuration, the pressure mechanism 40 includes the pressure plate 41, the pressure spring (the biasing member) 42, the cam member 43, and the support member 44, and the pressure plate 41, the pressure spring 42, and the cam member 43 are disposed and positioned on the support member 44. The support member 44 is a member separate from the fixing frame 31, and is not affected by dimensional accuracy of the fixing frame 31. That is, the pressure mechanism 40 can have its dimensional accuracy enhanced independently of the fixing frame 31, and can easily adjust the contact pressure between the fixing belt 32 and the pressure roller 33. Consequently, it becomes possible, with a compact, low-cost, simple configuration, to stabilize the contact pressure between the fixing belt 32 and the pressure roller 33.

Further, the side plate 311 of the fixing frame 31 includes, in relation to the securing of the support member 44 of the pressure mechanism 40, a securing portion 311*f* and a positioning hole 311*h*.

The securing portion 311*f* is disposed upstream of the belt holder 34 in the sheet conveyance direction Dc. The securing portion 311*f* is disposed opposite to the lower wall portion 44*b* of the support member 44. An upper surface of the securing portion 311*f* is opposed, and adjacent, to a lower surface of the lower wall portion 44*b*, and extends substantially in the horizontal direction. In other words, the securing portion 311*f* is formed adjacent to the swing fulcrum 41*a* of the pressure plate 41. And, to the securing portion 311*f*, the lower wall portion 44*b*, which is one end side of the support member 44 on the upstream side in the sheet conveyance direction Dc, is secured with a fastening member 36 that is a screw or the like.

The positioning hole 311*h* is disposed downstream of the belt holder 34 in the sheet conveyance direction Dc. At the position where the rotation shaft 43*x* of the cam member 43 is disposed, the positioning hole 311*h* penetrates the side plate 311 in the axial direction of the rotation shaft 43*x*. That is, the positioning hole 311*h* is formed at a position overlapping the through hole 44*h* formed at the other end side of the support member 44 on the downstream side of the sheet conveyance direction Dc. And, in the positioning hole 311*h*, the rotation shaft 43*x* of the cam member 43 is inserted.

According to the configuration described above, positioning and securing of the support member 44 of the pressure mechanism 40 is performed with respect to the side plate 311, via the positioning hole 311*h* and the securing portion 311*f*. Specifically, the support member 44 is positioned on a plane of the side plate 311 by means of the positioning hole 311*h*. Further, the support member 44 is secured to the securing portion 311*f* in order to prevent the support member 44 from rotating about the rotation shaft 43*x* of the cam member 43, which is inserted in the positioning hole 311*h*. Thereby, the pressure mechanism 40 is disposed appropriately with respect to the fixing frame 31, and can stabilize the contact pressure between the fixing belt 32 and the pressure roller 33.

Further, the pressure spring 42, which is a compression coil spring, is disposed opposite to the belt holder 34 (the fixing belt 32) across the pressure plate 41. The pressure spring 42 biases the fixing belt 32 toward the pressure roller 33 via the pressure plate 41 and the belt holder 34. And, as shown in FIG. 3, the compression coil spring (the pressure spring 42) has a central axis of its coil part disposed so as to overlap a straight line L1 that passes through a rotation center C1 of the fixing belt 32, which is adjacent to the pressure plate 41.

According to the above configuration, it is possible to apply a necessary pressure along an appropriate pressure direction (line L1 direction). As a result, it is possible to suppress unevenness of the contact pressure between the fixing belt 32 and the pressure roller 33 generated by the pressure mechanism 40 and to suppress inclination of the fixing belt 32 biased by the pressure spring 42.

The above-described embodiment is by no means meant to limit the scope of the present disclosure, and various modifications can be made and implemented within the scope not departing from the gist of the present disclosure.

For example, in the embodiment described above, the pressure plate 41 is disposed adjacent to the belt holder 34 (the fixing belt 32), but instead, a configuration may be adopted where the pressure plate 41 is disposed adjacent to the pressure roller 33. That is, in the present embodiment, it is the pressure plate 41 that is biased by the pressure spring 42 in the approaching direction with respect to the belt holder 34 (the fixing belt 32), but instead, a configuration may be adopted where the pressure plate 41 is biased in the approaching direction with respect to the pressure roller 33.

Further, in the embodiment described above, it is assumed that the image forming apparatus 1 is an image forming apparatus for monochrome printing, but the present disclosure is not limited to image forming apparatuses of that type. The image forming apparatus 1 may be an image forming apparatus for color printing, for example.

The invention claimed is:

1. A fixing device, comprising:
- a heating member;
- a pressure member that contacts the heating member and has pressure applied thereto to form a fixing nip portion;
- a pressure mechanism that adjusts contact pressure of the fixing nip portion; and
- a fixing frame including a side plate that supports the heating member, the pressure member, and the pressure mechanism, the fixing device inserting a recording medium having a toner image formed thereon into the fixing nip portion to apply heat and pressure to the recording medium to thereby fix the toner image onto the recording medium, wherein the pressure mechanism includes a pressure plate that swings in an approaching direction and a separating direction with respect to one of the heating member and the pressure member, a biasing member that biases the pressure plate in the approaching direction with respect to one of the heating member and the pressure member, a cam member that contacts the pressure plate on a side opposite to the biasing member and rotates to cause the pressure plate to swing, and a support member that is secured to the side plate of the fixing frame and supports one end of the biasing member and a swing fulcrum of the pressure plate, and the support member has a through hole in which a rotation axis of the cam member is inserted.

2. The fixing device according to claim 1, wherein the fixing frame includes a securing portion that is formed adjacent to the swing fulcrum of the pressure plate, and to which one end side of the support member is secured by means of a fastening member, and a positioning hole that is formed at a position overlapping the through hole formed in another end side of the support member, and in which the rotation axis of the cam member is inserted.

3. The fixing device according to claim 1, wherein the biasing member is a compression coil spring, and a central axis of the compression coil spring is disposed so as to overlap a line passing through a rotation center of one of the heating member and the pressure member that is adjacent to the pressure plate.

4. An image forming apparatus, comprising:

an image forming portion that forms a toner image on the recording medium; and the fixing device according to claim 1 that applies heat and pressure to the recording medium, on which the toner image has been formed by the image forming portion, to thereby fix the toner image onto the recording medium.

* * * * *